United States Patent
Leu et al.

(10) Patent No.: US 6,706,098 B2
(45) Date of Patent: Mar. 16, 2004

(54) FRAGRANT INK-JET INK

(75) Inventors: Yi-Jing Leu, Hsinchu (TW); In-Shan Sir, Kaohsiung (TW); Yu-Chang Shen, Taipei (TW); Chia-Hsin Chien, Taoyuan (TW)

(73) Assignee: Benq Corporation (TW)

( * ) Notice: Subject to any disclaimer, the term of this patent is extended or adjusted under 35 U.S.C. 154(b) by 0 days.

(21) Appl. No.: 10/157,084

(22) Filed: May 30, 2002

(65) Prior Publication Data

US 2003/0005853 A1 Jan. 9, 2003

(30) Foreign Application Priority Data

Jun. 8, 2001 (TW) ........................................ 90114012 A

(51) Int. Cl.⁷ ............................................... C09D 11/00
(52) U.S. Cl. ............................... 106/31.02; 106/31.27; 106/31.58; 106/31.6; 106/31.86
(58) Field of Search .......................... 106/31.02, 31.27, 106/31.6, 31.58, 31.86

(56) References Cited

U.S. PATENT DOCUMENTS

| | | | | | |
|---|---|---|---|---|---|
| 5,577,947 | A | * | 11/1996 | Malloy et al. | 446/220 |
| 6,123,757 | A | * | 9/2000 | Yang et al. | 106/31.02 |
| 6,160,034 | A | * | 12/2000 | Allison et al. | 523/161 |
| 6,261,347 | B1 | * | 7/2001 | Moreland | 106/31.02 |
| 6,454,842 | B1 | * | 9/2002 | Vernardakis et al. | 106/31.02 |
| 6,491,747 | B2 | * | 12/2002 | Miyamoto et al. | 106/31.58 |
| 2002/0174800 | A1 | * | 11/2002 | Moreland | 106/31.02 |
| 2003/0094117 | A1 | * | 5/2003 | Sir et al. | 106/31.02 |

FOREIGN PATENT DOCUMENTS

TW  474974  2/2002

* cited by examiner

*Primary Examiner*—Helene Klemanski
(74) *Attorney, Agent, or Firm*—Rabin & Berdo, PC

(57) ABSTRACT

A fragrant ink-jet ink including: a fragrant agent, a surfactant, wherein a boiling point of the surfactant is above 78° C. and a Hydrophilic Lipophilic Balance (HLB) of the surfactant is in a range of about 5 to 16, a colorant, and a solvent. The fragrant agent can be a natural fragrant agent, a synthetic fragrant agent or a mixture thereof. The amount of the fragrant agent is about 0.01 wt % to 10.0 wt %.

34 Claims, No Drawings

FRAGRANT INK-JET INK

This application incorporates by reference of Taiwan application Serial No. 090114012, filed Jun. 8, 2001.

BACKGROUND OF THE INVENTION

1. Field of the Invention

The invention relates in general to an ink-jet ink, and more particularly to a fragrant ink-jet ink.

2. Description of the Related Art

Essential oil, normally extracted from animals or plants, is hot goods in the recent market and important for human and other living beings. Essential oil influence human spiritually and emotionally. Scent comforts people and helps to refresh. The use of spices in religious ceremonies was recorded. Since 3000 years ago to the middle ages, people in Babylon and Greece started to use aromatic rubber resin, fragrant wood and vanilla and believed them have the power of healing and value of hygiene. India and South East Asia are treasure-house of attar and flavorings, which are widely used in people's daily life, such as cosmetics and bathing, in addition to religious ceremony.

Perfumes can be sorted as natural perfumes and synthetic perfumes by their origins. The natural perfumes are obtained from living beings by the separation steps such as extraction, condensation, oil pressing or distillation and can be categorized as plant-originated perfumes and animal-originated perfumes. The synthetic perfumes are manufactured by chemical synthesize. One of the categories is petrochemical perfume.

Perfumes can also be sorted into 5 grades by their contents of essence. (1) Parfum, also called condensed Eau de parfum, contains more than 20 wt % of essence. It is the highest grade. (2) Eau de parfum contains 15 to 20 wt % of essence, which is cheaper than parfum. (3) Eau de toilette contains 8 to 15 wt % of essence, which is more popular. (4) Eau de cologne contains 4 to 8 wt % of essence. Most male perfumes belong to this grade. (5) Eau fraiche contains 1 to 3 wt % of essence.

Perfumes can be categorized as flower perfumes and fancy perfumes. For flower perfumes, the floral fragrance like roses, jasmines or tuberoses is used as a base to manufacture perfumes with single floral fragrance perfumes or multi floral fragrance perfumes. Fancy perfume uses natural beings other than flowers as a base, to express forests, grasses, places, landscapes, characters, music or certain atmospheres.

Perfumes are blends of essences, water and ethanol. Most essences are oil-soluble and are not soluble in water. Ethanol has the drawbacks of low boiling point, high volatility, low durability, being lipo-phobic, and hard to emulsify. Thus, surfactant is frequently added to emulsify essences. By adding hydro-phobic functional group at the oil-soluble essence particles, oil-in-water type emulsion is formed. To ensure the stability of the perfume, surfactants with proper percentage of long and short hydrophobic functional groups are required. (HLB) is proposed by Griffin to characterize surfactants. The hydrophilic-lipophilic balance (HLB) is an empirical number that describes the relationship between the hydrophilic (water-soluble) and lipophilic (oil-soluble) portions of a surfactant molecule. There are a number of ways to determine HLB. The general rule is to determine the ratio of lipophilic functional groups to the whole surfactant molecular. Surfactants with a strong lipophilic character have a low HLB, while the ones with a stronger hydrophilic character have a high HLB. The surfactants for perfumes can be also characterized by the solubility of spices in the surfactants. Alcohol type spices have higher solubility, ketone type spices have less and ester type spices have the lowest in the three.

Magenta inks, cyan inks, yellow ink and black inks are four common inks. Most of them apply water-base dyes. Light magenta inks, light cyan inks, and even light yellow ink become popular recently to form six-color inks or even seven-color inks. Theses four-color inks, six-color inks and seven-color inks include at least one water-soluble dye, water, organic solvents and other additives. However, the additives like colorants, surfactants and pH buffers are mostly organic compounds and are pungent.

U.S. Pat. No. 6,123,757 discloses a composition of a fragrant ink, including a alcohol, a chemical compound for forming images, an aromatic compound, deionized water and ethanol. The aromatic compound in the ink covers the pungent odor of the other ink ingredients and produces fragrance. In the invention, ethanol is chosen as a surfactant. However, ethanol is poor at emulsification. Ethanol is not able to dissolve the aromatic compounds completely in the inks, and therefore unable to effectively provide fragrance. Further more, the uneven dispersion often causes nozzle clogging. Also, ethanol has a low boiling point and high volatility, which leads the aromatic compounds to volatilize. As a result, the durability of the fragrance of the printed figures is greatly reduced. Moreover, inks with ethanol have low surface tension, which causes the printed words and figures to fade and spread.

SUMMARY OF THE INVENTION

It is therefore an object of the invention to provide a fragrant ink-jet ink keeps approximately the same physical properties, such as surface tension, pH value, optical density and brightness as a common ink-jet ink. The fragrant ink-jet ink causes the printed figure and words to emit a pleasant scent.

The fragrant ink-jet ink of the invention comprises: a fragrant agent, a surfactant, wherein a boiling point of the surfactant is above 78° C. and a Hydrophilic Lipophilic Balance (HLB) of the surfactant is in a range of about 5 to 16, a colorant, and a solvent. The fragrant agent can be a natural fragrant agent, a synthetic fragrant agent or a mixture thereof. The natural fragrant agent is selected from the group consisting of: oil of rose, oil of cymbopogonmartini, oil of lena-batu, oil of sandal, rosemary, oil of lavender, oil of fennel, oil of jasmin, oil of cinnamon, oil of lilac, oil of Ylang-Ylang, oil of turpentine, musk, ciret, castreum and ambergris. The synthetic fragrant agent is selected from the group consisting of: β-caryophyllene, linalool, α-terpineol, cinnamic aldehyde, salicylic aldehyde, allyl caproate, β-Ionone, maltol, musk ambrette, anethole, thymol, eugenol, isosafrol, benzoic acid, methyl phenylacetate, oxide ketone, and 1-bromo-2-phenylethylene. The amount of the fragrant agent is about 0.01 wt % to 10.0 wt %.

The surfactant of the invention is selected from the group consisting of: 2-propanol, di-1,2-propylene glycol, 2-pyrrolidone, N-methyl-2-pyrrolidone, 2,4,7,9-tetramethyl-5-decyne-4,7-diol and 1,1,1-trimethylolpropane. And the amount is about 0.05 wt % to 30.0 wt %.

The solvent can be water such as deionized water, organic solvent or the mixture thereof. The amount of water is about 50 wt. %~90 wt %. The organic solvent can be selected from the group consisting of: cyclohexane, methanol, ethanol, ethylene glycol, diethylene glycol, triethylene glycol, polyethylene glycol, propylene glycol, butylene glycol, pentylene glycol, hexylene glycol and polyhydric alcohol. The amount of the organic solvent is about 0.01 wt %~5 wt %.

The fragrant ink-jet ink can further comprise a pH buffer and the pH buffer is selected from the group consisting of: diethanolamine, triethanolamine, a hydroxide of alkali metal, ammonium hydroxide and a carbonate of alkali metal.

The fragrant ink-jet ink can further comprise a humectant and the humectant is a polymer comprising a hydrophilic segment and a hydrophobic segment, selected from a group consisting of: polyethandiol, polypropandiol, ethyleneoxy/propyleneoxy (EO/PO) copolymer, butyleneoxy/ethyleneoxy (BO/EO) copolymer, sodium dioctyl sulfosuccinate, alkylene oxide adduct of acetylene glycol, polybutyl resin, cellulose derivative, styrene/acrylic copolymer resin and maleic acid/styrene copolymer.

The fragrant ink-jet ink can further comprise a chelating agent, which is selected from sodium ethylenediamine tetraacetate, trisodium nitrilotriacetate, hydroxyethyl ethylenediamine trisodium acetate, diethylenetriamino pentasodium acetate, and uramil disodium acetate.

Other additives like biocides, preservatives and UV absorbents can be also added.

Other objects, features, and advantages of the invention will become apparent from the following detailed description of the preferred but non-limiting embodiments.

DETAILED DESCRIPTION OF THE INVENTION

The fragrant ink-jet ink of the invention at least includes a fragrant agent, a surfactant and a colorant, dissolved in a solvent. Preferably, the fragrant ink-jet ink of the invention further comprises a pH buffer, a humectant, a chelating agent, a biocide, a preservative and an UV absorbent.

The fragrant agent can be a natural fragrant agent, a synthetic fragrant agent, or a mixture of uncertain number of natural fragrant agents and synthetic fragrant agents. The preferred amount of the fragrant agent is about 0.01 wt % to 10.0 wt %. The natural fragrant agent can be obtained from animal or botanicals. Oil of rose, oil of cymbopogonmartini, oil of lena-batu, oil of sandal, rosemary, oil of lavender, oil of fennel, oil of jasmin, oil of cinnamon, oil of lilac, oil of Ylang-Ylang, oil of turpentine, musk, ciret, castreum and ambergris are all ideal sources of the natural fragrant agent. β-caryophyllene, linalool, α-terpineol, cinnamic aldehyde, salicylic aldehyde, allyl caproate, β-Ionone, maltol, musk ambrette, anethole, thymol, eugenol, isosafrol, benzoic acid, methyl phenylacetate, oxide ketone, and 1-bromo-2-phenylethylene are all examples of preferred synthetic fragrant agents.

The surfactant of the fragrant ink-jet ink of the invention has a boiling point of approximately above 78° C. and a HLB of about 5 to 16, preferably of about 8 to 12. The preferred amount of the surfactant is about 0.05 wt %~30.0 wt %. The surfactant of the invention can be any one or any combination of the following: 2-propanol, di-1,2-propylene glycol, 2-pyrrolidone, N-methyl-2-pyrrolidone, 2,4,7,9-tetramethyl-5-decyne-4,7-diol and 1,1,1-trimethylolpropane. Further more, the colorant in the ink-jet ink of the invention can be a dye or a pigment.

All agents of the fragrant ink-jet ink of the invention are preferably dissolved in solvent like water, particularly deionized water. The amount of water can be about 50.0 wt %~90.0 wt %. The solvent can further comprise an organic solvent and the amount of the organic solvent is preferably about 0.01 wt %~5 wt %. The organic solvent enhances the penetration and dispersion of the ink. The organic solvent can be any one or any combination of the following: cyclohexane, methanol, ethanol, ethylene glycol, diethylene glycol, triethylene glycol, polyethylene glycol, propylene glycol, butylene glycol, pentylene glycol, hexylene glycol and polyhydric alcohol.

The fragrant ink-jet ink of the invention is prepared by first mixing the fragrant agent and the surfactant with a HLB between 5~16 and a boiling point of above 78° C. in a ratio of about 1:6 (fragrant agent: surfactant). Then add the mixture in the ink. Using the fragrant ink-jet ink of the invention for ink-jet printing causes the printed documents to emit a pleasant scent.

Colorants can only manifest the ideal color in an appropriate range of pH value. Therefore, the ink-jet ink of the invention preferably further comprises a pH buffer. The pH buffer of the invention can be any one or any combination of the following: diethanolamine, triethanolamine, hydroxides of alkali metals, ammonium hydroxide, and carbonates of alkali metals. The hydroxides of alkali metals can be, for example, lithium hydroxide, sodium hydroxide, or potassium hydroxide. The carbonates of alkali metals can be, for example, lithium carbonate, sodium carbonate or potassium carbonate.

To prevent the clogging of the nozzle, humectants can be added because humectants slow down the speed of ink evaporation. Humectants can be any one or any combination of the following: polyethandiol, polypropandiol, ethyleneoxy/propyleneoxy (EO/PO) copolymer, butyleneoxy/ethyleneoxy (BO/EO) copolymer, sodium dioctyl sulfosuccinate, alkylene oxide adduct of acetylene glycol, polybutyl resin, cellulose derivative, styrene/acrylic copolymer resin, maleic acid/styrene copolymer and a polymer having both a hydrophilic segment and a hydrophobic segment.

The fragrant ink-jet ink of the invention can further comprise a chelating agent, which prevents the crystallization of the salt and the consequential nozzle clogging. The chelating agent of the invention can be any one or any combination of the following: sodium ethylenediamine tetraacetate, trisodium nitrilotriacetate, hydroxyethyl ethylenediamine trisodium acetate, diethylenetriamino pentasodium acetate and uramil disodium acetate.

A biocide, a preservative and an UV absorbent are examples of the preferred additives. The biocide and preservative inhibit the growing of the bacteria and prevent the ink from deteriorating. The UV absorbent enhances the light-fastness of the ink.

It is well known to persons skilled in the art that other additives which enhance light fastness or the stability in storage can also be added in the fragrant ink of the invention.

The following exampled recipe of the fragrant ink-jet ink is taken to study the physical property of the ink.

EXAMPLE I

The fragrant ink-jet ink 1 does not include any fragrant agent and is therefore used as a control. On the other hands, the fragrant ink-jet ink 2 includes 0.01 wt % ocean perfume; the fragrant ink-jet ink 3 includes 0.01 wt % Phytoncide. The three fragrant ink-jet inks have some common compositions and are dissolved in deionized water. The common compositions are as follows.

| | |
|---|---|
| surfactant | 0.06 wt % |
| colorant | 5.0 wt % |
| organic solvent | 5.0 wt % |
| pH buffer, chelating agent, biocide, humectant, preservative, UV absorbent and other additive | 5.0 wt % |

The surfactant of the fragrant ink-jet ink of the invention has a boiling point of approximately above 78° C. and a HLB of about 5 to 16. The surfactant of the invention can be any one or any combination of the following: 2-propanol, di-1,2-propylene glycol, 2-pyrrolidone, N-methyl-2-pyrrolidone, 2,4,7,9-tetramethyl-5-decyne-4,7-diol, and 1,1,1-trimethylolpropane.

The fragrant agent and the surfactant are firstly mixed well in a ratio of 1:6. The mixture of fragrant agent and the surfactant is then added in the ink. Commercial ink-jet printers are used to jet the three fragrant ink-jet inks respectively onto the commercial plain paper and the coating paper.

The surface tension and the pH value of the three fragrant ink-jet inks are tested and the results are listed in Table 1. The optical density (OD) and light (L) are tested by a commercial colorimeter and are listed in Table 2. Using the ink-jet ink 1 (the control) as a standard, the differences between the ink-jet ink 2 and the ink-jet ink 1 and the difference between the ink-jet ink 3 and the ink-jet ink 1 are counted and listed in Table 3.

TABLE 1

| Fragrant ink-jet ink | | Cyan ink | Magenta ink | Yellow ink |
|---|---|---|---|---|
| No. 1 | Surface | 28.3 | 28.3 | 28.8 |
| No. 2 | Tension | 28.5 | 28.4 | 29.3 |
| No. 3 | (dyne/cm) | 28.7 | 28.9 | 29.5 |
| No. 1 | pH Value | 7.42 | 5.62 | 6.82 |
| No. 2 | | 7.51 | 5.46 | 6.76 |
| No. 3 | | 7.51 | 5.94 | 6.90 |

TABLE 2

| Fragrant ink-jet ink | | Cyan ink | Magenta ink | Yellow ink |
|---|---|---|---|---|
| No. 1 | OD | 1.065 (P)* | 1.242 (P) | 1.193 (P) |
| | | 1.51 (C)* | 1.77 (C) | 1.80 (C) |
| No. 2 | | 1.082 (P) | 1.257 (P) | 1.205 (P) |
| | | 1.763 (C) | 1.751 (C) | 1.482 (C) |
| No. 3 | | 1.043 (P) | 1.022 (P) | 1.051 (P) |
| | | 1.480 (C) | 1.663 (C) | 1.691 (C) |
| No. 1 | L | 62.84 (P) | 46.96 (P) | 86.51 (P) |
| | | 54.38 (C) | 40.41 (C) | 82.43 (C) |
| No. 2 | | 61.82 (P) | 46.38 (P) | 86.05 (P) |
| | | 53.24 (C) | 38.64 (C) | 79.96 (C) |
| No. 3 | | 63.17 (P) | 54.97 (P) | 88.91 (P) |
| | | 55.02 (C) | 45.20 (C) | 85.46 (C) |

*"P" indicates that a result is tested by printing on a plain paper.
*"C" indicates that a result is tested by printing on a coating paper.

TABLE 3

| Fragrant ink-jet ink | | Cyan ink | Magenta ink | Yellow ink |
|---|---|---|---|---|
| No. 2 | ΔSurface | 0.2 | 0.1 | 0.5 |
| No. 3 | Tension | 0.1 | 0.6 | 0.7 |

TABLE 3-continued

| Fragrant ink-jet ink | | Cyan ink | Magenta ink | Yellow ink |
|---|---|---|---|---|
| No. 2 | ΔpH value | 0.09 | 0.16 | 0.06 |
| No. 3 | | 0.09 | 0.32 | 0.08 |
| No. 2 | ΔOD | 0.017 (P)* | 0.015 (P) | 0.012 (P) |
| | | 0.253 (C)* | 0.019 (C) | 0.318 (C) |
| No. 3 | | 0.022 (P) | 0.220 (P) | 0.142 (P) |
| | | 0.03 (C) | 0.107 (C) | 0.109 (C) |
| No. 2 | ΔL | 1.02 (P) | 0.58 (P) | 0.46 (P) |
| | | 1.14 (C) | 1.77 (C) | 2.47 (C) |
| No. 3 | | 0.33 (P) | 8.01 (P) | 2.4 (P) |
| | | 0.64 (C) | 4.79 (C) | 3.03 (C) |

*"P" indicates that a result is tested by printing on a plain paper.
*"C" indicates that a result is tested by printing on a coating paper.

From the results listed on the above three tables, it is therefore apparent that a fragrant ink-jet ink made of an fragrant agent and a surfactant with a boiling point of above 78° C. and a HLB in a range of about 5 to 16 keeps approximately the same physical properties, such as surface tension, pH value, optical density and brightness as the fragrant ink-jet ink without fragrant agents. The ink-jet ink 2 causes the printed documents to emit a pleasant scent and create an atmosphere like being near the sea. The ink-jet ink 3 creates an atmosphere like being in the forest. The pungent irritating odor of organic compounds in the ink-jet ink is covered either by the ink-jet ink 2 or the ink-jet ink 3.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fragrant ink-jet ink, comprising:
   a fragrant agent;
   a surfactant, wherein a boiling point of the surfactant is above 78° C. and a Hydrophilic Lipophilic Balance (HLB) of the surfactant is in a range of about 5 to 16;
   a pH buffer;
   a colorant; and
   a solvent.

2. The fragrant ink-jet ink of claim 1, wherein the fragrant agent is a natural fragrant agent.

3. The fragrant ink-jet ink of claim 1, wherein the fragrant agent is a synthetic fragrant agent.

4. The fragrant ink-jet ink of claim 1, wherein the fragrant agent is a mixture of a natural fragrant agent and a synthetic fragrant agent.

5. The fragrant ink-jet ink of claim 2, wherein the natural fragrant agent is selected from the group consisting of: oil of rose, oil of cymbopogonmartini, oil of lena-batu, oil of sandal, rosemary, oil of lavender, oil of fennel, oil of jasmin, oil of cinnamon, oil of lilac, oil of Ylang-Ylang, oil of turpentine, musk, ciret, castreum and ambergris.

6. The fragrant ink-jet ink of claim 3, wherein the synthetic fragrant agent is selected from the group consisting of: β-caryophyllene, linalool, α-terpineol, cinnamic aldehyde, salicylic aldehyde, allyl caproate, β-Ionone, maltol, musk ambrette, anethole, thymol, eugenol, isosafrol, benzoic acid, methyl phenylacetate, oxide ketone, and 1-bromo-2-phenylethylene.

7. The fragrant ink-jet ink of claim 1, wherein the amount of the fragrant agent is about 0.01 wt % to 10.0 wt %.

8. The fragrant ink-jet ink of claim 1, wherein the surfactant is selected from the group consisting of: 2-propanol, di-1,2-propylene glycol, 2-pyrrolidone, N-methyl-2-pyrrolidone, 2,4,7,9-tetramethyl-5-decyne-4,7-diol and 1,1,1-trimethylolpropane.

9. The fragrant ink-jet ink of claim 1, wherein the amount of the surfactant is about 0.05 wt % to 30.0 wt %.

10. The fragrant ink-jet ink of claim 1, wherein the solvent is water.

11. The fragrant ink-jet ink of claim 10, wherein the amount of said water is about 50 wt %~90wt %.

12. The fragrant ink-jet ink of claim 1, wherein the solvent comprises water and an organic solvent.

13. The fragrant ink-jet ink of claim 12, wherein said water is deionized water.

14. The fragrant ink-jet ink of claim 12, wherein the organic solvent is selected from the group consisting of: cyclohexane, methanol, ethanol, ethylene glycol, diethylene glycol, triethylene glycol, polyethylene glycol, propylene glycol, butylene glycol, pentylene glycol, hexylene glycol and polyhydric alcohol.

15. The fragrant ink-jet ink of claim 12, wherein the amount of the organic solvent is about 0.01 wt %~5 wt %.

16. The fragrant ink-jet ink of claim 1, wherein the pH buffer is selected from the group consisting of: diethanolamine, triethanolamine, a hydroxide of alkali metal, ammonium hydroxide and a carbonate of alkali metal.

17. The fragrant ink-jet ink of claim 1, further comprising a humectant.

18. The fragrant ink-jet ink of claim 17, wherein the humectant is a polymer comprising a hydrophilic segment and a hydrophobic segment.

19. The fragrant ink-jet ink of claim 17, wherein the humectant is selected from the group consisting of: polyethandiol, polypropandiol, ethyleneoxy/propyleneoxy (EO/PO) copolymer, butyleneoxy/ethyleneoxy (BO/EO) copolymer, sodium dioctyl sulfosuccinate, alkylene oxide adduct of acetylene glycol, polybutyl resin, cellulose derivative, styrene/acrylic copolymer resin and maleic acid/styrene copolymer.

20. A fragrant ink-jet ink, comprising:
   a fragrant agent;
   a surfactant, wherein a boiling point of the surfactant is above 78° C. and a Hydrophilic Lipophilic Balance (HLB) of the surfactant is in a range of about 5 to 16;
   a chelating agent;
   a colorant; and
   a solvent.

21. The fragrant ink-jet ink of claim 20, wherein the chelating agent is selected from the group consisting of sodium ethylenediamine tetraacetate, trisodium nitrilotriacetate, hydroxyethyl ethylenediamine trisodium acetate, diethylenetriamino pentasodium acetate, and uramil disodium acetate.

22. The fragrant ink-jet ink of claim 1, further comprising a biocide.

23. The fragrant ink-jet ink of claim 1, further comprising a preservative.

24. The fragrant ink-jet ink of claim 1, further comprising an UV absorbent.

25. The fragrant ink-jet ink of claim 1, wherein a weight ratio of the fragrant agent to the surfactant is about 1:6.

26. The fragrant ink-jet ink of claim 20, wherein the fragrant agent is a natural fragrant agent, a synthetic fragrant agent, or a mixture thereof.

27. The fragrant ink-jet ink of claim 26, wherein the natural fragrant agent is selected from the group consisting of: oil of rose, oil of cymbopogonmartini, oil of lena-batu, oil of sandal, rosemary, oil of lavender, oil of fennel, oil of jasmin, oil of cinnamon, oil of lilac, oil of Ylang-Ylang, oil of turpentine, musk, ciret, castreum and ambergris.

28. The fragrant ink-jet ink of claim 26, wherein the synthetic fragrant agent is selected from the group consisting of: β-caryophyllene, linalool, α-terpineol, cinnamic aldehyde, salicylic aldehyde, allyl caproate, β-lonone, maltol, musk ambrette, anethole, thymol, eugenol, isosafrol, benzoic acid, methyl phenylacetate, oxide ketone, and 1-bromo-2-phenylethylene.

29. The fragrant ink-jet ink of claim 20, wherein the surfactant is selected from the group consisting of: 2-propanol, di-1,2-propylene glycol, 2-pyrrolidone, N-methyl-2-pyrrolidone, 2,4,7,9-tetramethyl-5-decyne-4,7-diol and 1,1,1-trimethylolpropane.

30. The fragrant ink-jet ink of claim 20, wherein the amount of the fragrant agent is about 0.01 wt % to 10.0 wt %, the amount of the surfactant is about 0.05 wt % to 30.0 wt %, and the amount of said solvent is about 50 wt %~90 wt %.

31. The fragrant ink-jet ink of claim 20, wherein the solvent comprises water, or a mixture of water and an organic solvent.

32. The fragrant ink-jet ink of claim 31, wherein the organic solvent is selected from the group consisting of: cyclohexane, methanol, ethanol, ethylene glycol, diethylene glycol, triethylene glycol, polyethylene glycol, propylene glycol, butylene glycol, pentylene glycol, hexylene glycol and polyhydric alcohol.

33. The fragrant ink-jet ink of claim 20, further comprising a humectant.

34. The fragrant ink-jet ink of claim 33, wherein the humectant is a polymer comprising a hydrophilic segment and a hydrophobic segment.

* * * * *